(12) United States Patent
Dunbar et al.

(10) Patent No.: US 10,772,301 B2
(45) Date of Patent: Sep. 15, 2020

(54) NON-METALLIC ANIMAL TRAVEL LEASH AND HARNESS

(71) Applicant: Evan Dunbar, Roswell, GA (US)

(72) Inventors: Evan Dunbar, Roswell, GA (US); Kenneth E. Irwin, Jr., Dawsonville, GA (US)

(73) Assignee: Evan Dunbar, Roswell, GA (US)

( * ) Notice: Subject to any disclaimer, the term of this patent is extended or adjusted under 35 U.S.C. 154(b) by 234 days.

(21) Appl. No.: 15/837,692

(22) Filed: Dec. 11, 2017

(65) Prior Publication Data

US 2018/0168129 A1    Jun. 21, 2018

Related U.S. Application Data

(60) Provisional application No. 62/498,299, filed on Dec. 20, 2016.

(51) Int. Cl.
*A01K 27/00* (2006.01)

(52) U.S. Cl.
CPC .......... *A01K 27/003* (2013.01); *A01K 27/001* (2013.01); *A01K 27/002* (2013.01)

(58) Field of Classification Search
CPC .... A01K 27/003; A01K 27/001; A01K 27/00; A01K 27/004; A01K 27/005
See application file for complete search history.

(56) References Cited

U.S. PATENT DOCUMENTS

| 153,724 | A | | 8/1874 | Schmidt |
| 2,289,802 | A | * | 7/1942 | Norton ................. A01K 27/001 119/793 |
| 4,251,071 | A | * | 2/1981 | Norton ............... A63B 21/0004 482/125 |
| 4,317,257 | A | * | 3/1982 | Engel ..................... A22B 5/161 294/74 |
| 4,319,428 | A | * | 3/1982 | Fox ........................ A01G 17/04 24/115 H |
| 5,893,339 | A | * | 4/1999 | Liu ...................... A01K 27/002 119/770 |
| 7,066,113 | B2 | * | 6/2006 | Cheng ................. A01K 27/001 119/863 |
| 7,886,701 | B1 | | 2/2011 | Gordon |
| 8,327,808 | B2 | | 12/2012 | Chirico |
| 8,920,084 | B2 | * | 12/2014 | Dahl ....................... D07B 1/18 410/96 |
| 2011/0000440 | A1 | | 1/2011 | Mucerino, Jr. et al. |
| 2014/0096721 | A1 | * | 4/2014 | Millard ................ A01K 27/001 119/792 |
| 2018/0332827 | A1 | * | 11/2018 | Neffendorf .......... A01K 27/004 |

* cited by examiner

*Primary Examiner* — Trinh T Nguyen
(74) *Attorney, Agent, or Firm* — Panitch Schwarze Belisario & Nadel LLP

(57) ABSTRACT

A number of mechanisms are provided for aiding in animal handling through various security screening processes. An animal control implement makes it possible to undergo security screening while maintaining control of the animal while also not generating any security related false rejects.

8 Claims, 5 Drawing Sheets

NON-METALLIC ANIMAL TRAVEL LEASH AND HARNESS

CROSS-REFERENCE TO RELATED APPLICATIONS

This application claims priority to U.S. Provisional Patent Application No. 62/498,299 filed Dec. 20, 2016, which is incorporated herein by reference.

BACKGROUND OF THE INVENTION

1. Field of the Invention

The present invention relates generally to animal travel in airports, train stations, and anywhere metal detectors and other security screening devices are used and more particularly to the use of non-metallic implements to maintain animal control during the security screening processes.

2. Background

Animal travel including service animals—those used by persons with physical, mental, and emotional disabilities—in high traffic, public transportation environments has become an integral part of accommodating the traveling public. The direct and indirect revenue benefits the transportation industry, local, and state governments through sale of tickets and other streams of secondary transactions are considerable. In light of the public and economic advantages to traveling with service-oriented animals, security measures within transportation facilities (e.g., airports, train stations), create obstacles for animal handlers.

Typically traveling animals are tethered using leashes, collars, and harnesses containing metallic components that interfere with security screening. These apparatuses are often removed during security clearance procedures making the animal, handler, and bystanders vulnerable to potential control loss of the animal companion. This dynamic of animals passing through security screening has been shown to be problematic with the use of traditional, metallic encompassing leashes, collars and harnesses. For example, the Transportation Security Administration (TSA) requires small animals to be removed from animal carriers, the empty carrier to be placed on a conveyor belt, which scans personal property via X-ray, and the animal to be carried or walked through a security checkpoint that typically contains metal detectors. The process of removing an animal from its carrier, holding him untethered, or handling an unleashed companion for the purposes of TSA screening is problematic at best. Given the nature of metallic apparatuses used to maintain control of the animals present day security screening essentially requires the animal to pass through security essentially untethered. This condition is problematic and possibly dangerous for the animal, security personnel, and other passengers.

Thus, it is highly desirable to develop a new mechanism for tethering an animal to its handler that is completely compatible with security screening such that the animal can clear security without removal of the tethering device. Ideally, this mechanism should not burden the animal and indeed should help to reduce its stress in the abnormal situation of security screening. This dynamic of animals passing through security has been shown to be problematic with the use of traditional, metallic encompassing leashes, collars and harnesses.

SUMMARY OF THE INVENTION

Objects and advantages of the present invention will be set forth in part in the following description, or may be obvious from the description, or may be learned through practice of the invention.

Described are mechanisms, systems, and methodologies related to non-metallic implements to maintain animal control in secure areas, specifically in secure areas delineated by metal detectors or other forms of screening—e.g., backscatter X-rays, millimeter wave unit, etc.

With a general embodiment, an animal control implement is disclosed with no metallic parts or otherwise solid material objects that would interfere with automated security screening processes. Thus, this embodiment enables security screening of both the animal and controller at the same time without the need for the controller to surrender the animal or control thereof during the security screening process.

In a secondary embodiment a mechanism is revealed wherein a soft (i.e., non false rejects security interfering material) sliding tensioner is applied to the animal control implement thereby maintaining proper tautness around the animal's neck such that the animal does not encounter discomfort yet at the same time control over the animal is assured. This soft sliding tensioner maintains position by friction between the main body of the animal control implement and the tensioner.

In yet another embodiment, the soft sliding tensioner's position on the animal control implement is secondarily secured with additional sliding disk(s) thereby increasing friction between the soft sliding tensioner and the animal control implement thus ensuring static positioning is maintained.

A number of mechanisms and methodologies that provide practical details for reliably maintaining control of an animal through a security screening process without compromising the security of the system is disclosed. Although the examples provided herein are primarily related to dogs, it is clear that the same methods are applicable to any type of animal under the control of a handler going through security screening.

DETAILED DESCRIPTION OF THE INVENTION

Reference will now be made in detail to examples of the present invention, one or more embodiments of which are illustrated in the figures. Each example is provided by way of explanation of the invention, and not as a limitation of the invention. For instance, features illustrated or described with respect to one embodiment may be used with another embodiment to yield still a further embodiment. It is intended that the present application encompass these and other modifications and variations as come within the scope and spirit of the invention.

Certain terminology is used herein for convenience only and is not to be taken as a limitation on the present invention. The words "a" and "an", as used in the claims and in the corresponding portions of the specification, meaning "at least one." The terms "leash" and "harness" are used interchangeably throughout the specification to mean non-metallic animal control implement. The term "false reject" refers to the phenomenon where a security system incorrectly identifies a benign object as a threat. Finally, term "soft" material as used herein, denotes materials that principally do not trigger "false rejects" in security screening systems e.g., metal detectors, backscatter X-rays, millimeter wave unit.

Figure 1:
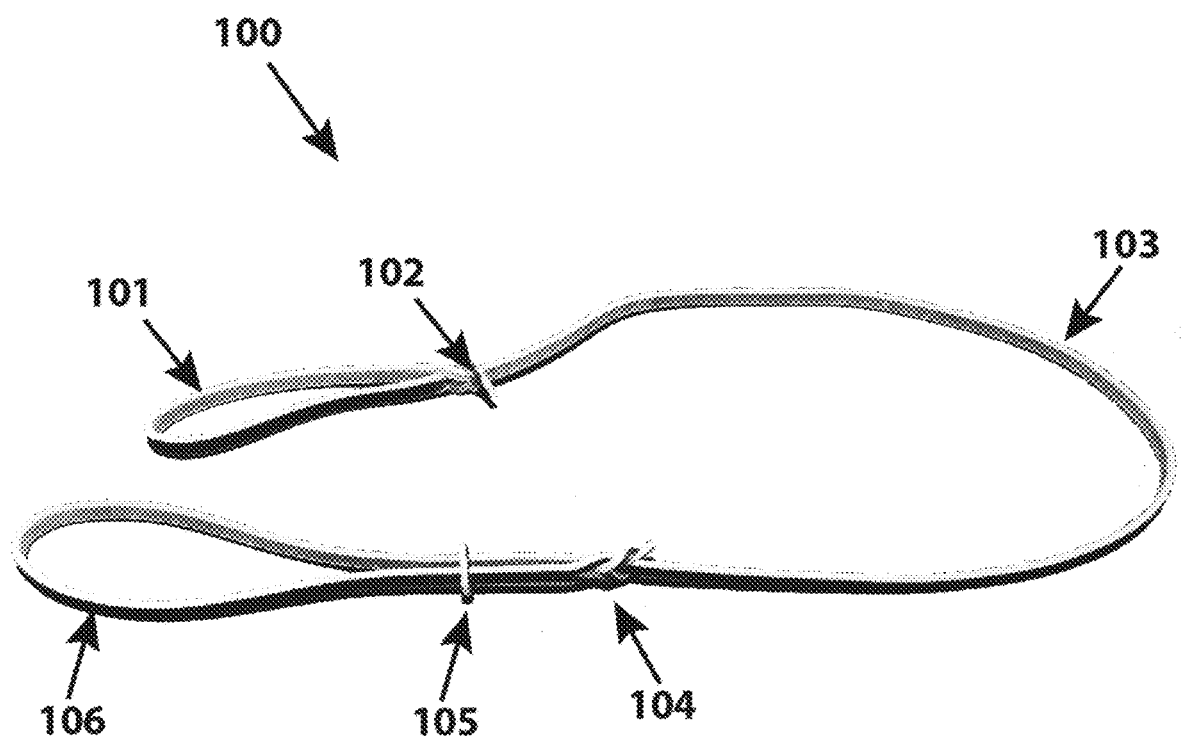
FIG. 1 is a first representative example of a non-metallic animal control implement as embodied by the present invention.

FIG. 1 is a first representative example of a non-metallic animal control implement configured as a leash as embodied by the present invention. As illustrated in invention 100, the non-metallic animal control implement is comprised exclusively of "soft" materials.

As illustrated in FIG. 1, the human handler interface to the animal control implement is a loop 101 that allows the human to maintain control of an animal. This loop 101 portion uniformly connects 102 to the lead 103 providing length and leverage allowing the human handler to maintain an upright position while maintaining control of the animal through any security screening process. In the embodiment of connection 102, the handler loop 101 is attached to the lead 103 portion via a weave type interface 102 that is principally comprised of the same soft material as the rest of the animal control implement 100, thus ensuring that the complete animal control implement 100 will pass through any security screening process seamlessly.

The invention's 100 animal control noose 106 is attached to the lead 103 portion via a braided 104 connection, again maintaining homogeneous soft component fabrication while at the same time providing flexibility and durability. To facilitate size adjustment for the noose portion 106, a sliding tensioner disk 105 comprised substantially of the same soft material as the rest of the animal control implement again maintaining compatibility with security screening equipment in an attempt to avoid false rejects. In the embodiment of 100, the sliding tensioner disk maintains it position due to friction between the disk slots and the lead material.

Those skilled in the art can appreciate that there are multiplicities of methods for connecting both the loop and the noose including: braiding, sewed connections, weaved, glued, etc. The essential concept is to ensure that the connection interface is accomplished with materials that do not generate false rejects during any security screening process. For example, metal clasps, hooks, or buckles would be unacceptable since the metal material would typically trigger phase rejects with a metal detector and may interfere with backscatter and soft X-ray scans.

Regardless of the connecting method utilized, it is essential that the preponderance of the animal control implement be comprised of soft materials that are completely benign to the security screening process. These soft materials must also exhibit sufficient tensional and torsional strength such that it is unlikely that the animal control implement would break during normal use. As a practical matter, this generally equates to about 320 Kg/cm ($\approx$705 lbs./in$^2$). Additionally, these soft material(s) should exhibit a sufficiently high static coefficient of friction ($\mu_s$) between the sliding tensioner disk portion and the noose portion that the noose maintains any set size under at least five pounds of tension—i.e., $\mu_s \geq$ about 0.55. Finally, the soft materials must be non-abrasive and comfortable for both the animal and handler. Ideally, the soft materials utilized should also be non-conductive and exhibit very little thermal transfer. A listing of some preferred soft materials suitable for fabricating the animal control implement is provided in Table 1.

TABLE 1

| Material | Width |
| --- | --- |
| Leather | 0.5, 0.75, 1, and 1.5 inch |
| Biothane ™ | 0.5, 0.75, 1, and 1.5 inch |
| Super Heavy Beta ® | 0.5, 0.625, 0.75, 1, and 1.25 inch |
| Rien Grip Material | 0.75 and 0.875 inch |

Figure 2:
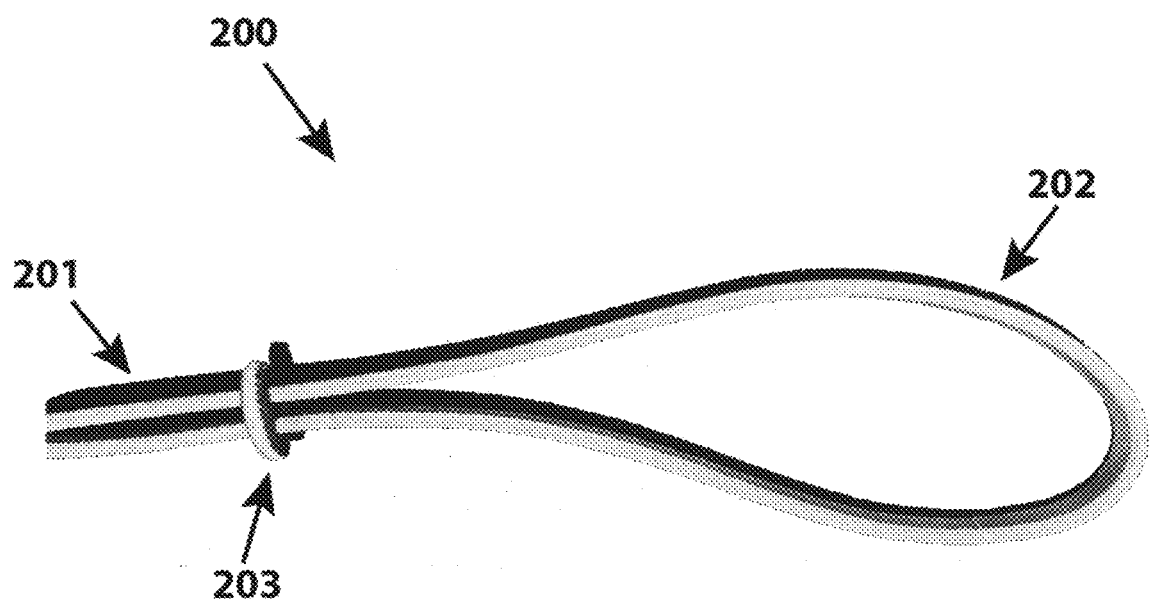
FIG. 2 is a magnified view of the invention of FIG. 1 highlighting the associated soft sliding tensioner.

FIG. 2 is a magnified view of the invention of FIG. 1 highlighting the associated soft sliding tensioner. As reflected in the drawing 200, lead 201 portion provides a sliding bridge of non-metallic soft material, creating friction when constricted by soft sliding tensioner 203. As illustrated, soft sliding tensioner 203 is a disk style tensioner, which can be moved in either direction, creating a variable sized noose 202 to suit the individual size of the animal. To secure the animal, noose 202 wraps around the neck, creating a soft and pliable, yet sturdy and reliable collar.

Figure 3:
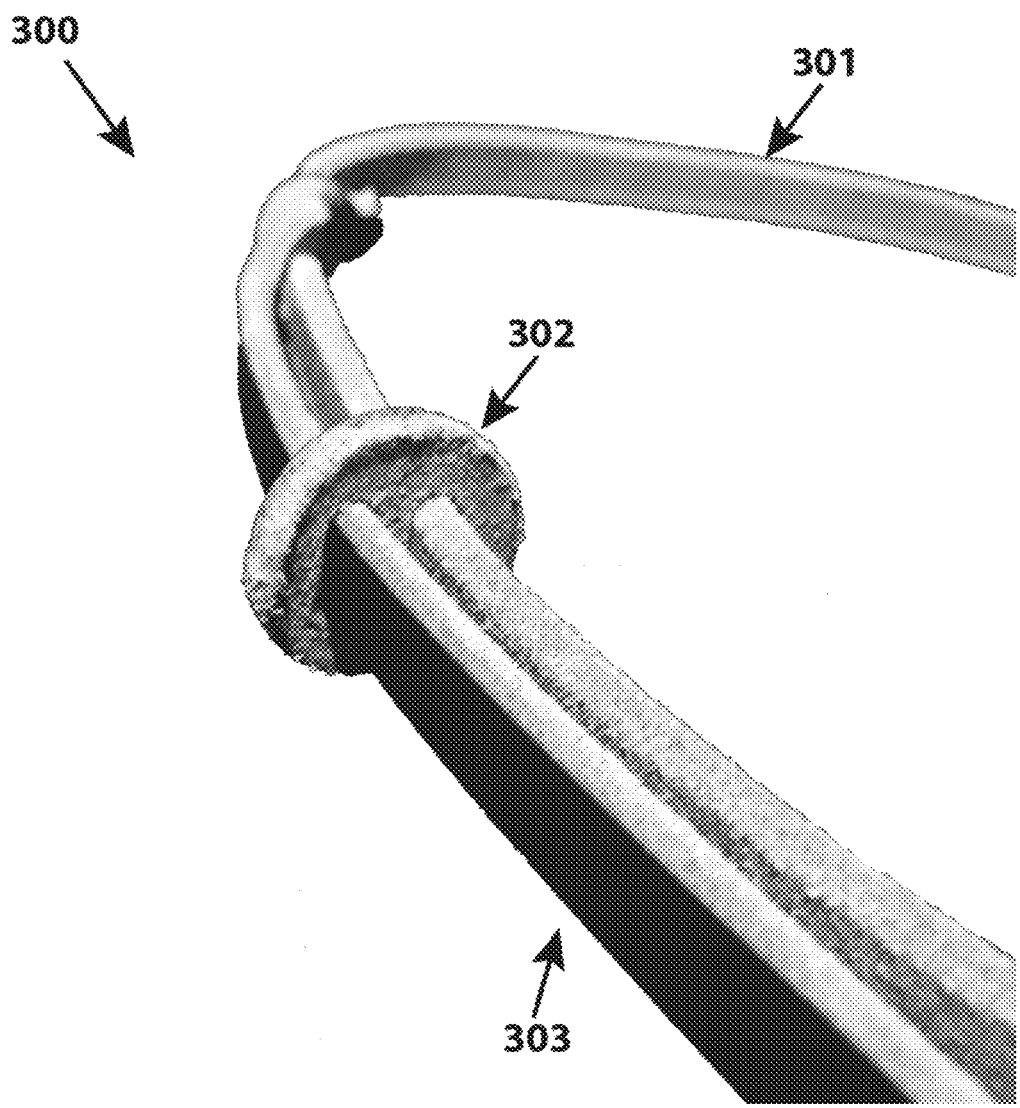
FIG. 3 is a further magnification of the soft sliding tensioner of FIG. 2.

FIG. 3 is a further magnification of the soft sliding tensioner of FIG. 2 as demonstrated in the drawing 300. As before a lead 301 portion delivers length and leverage with the handler able to quickly and easily fasten the implement to the animal's neck by sliding soft sliding tensioner 302 into the desired position, effectively cinching noose 303 securely and comfortably.

Figure 4:
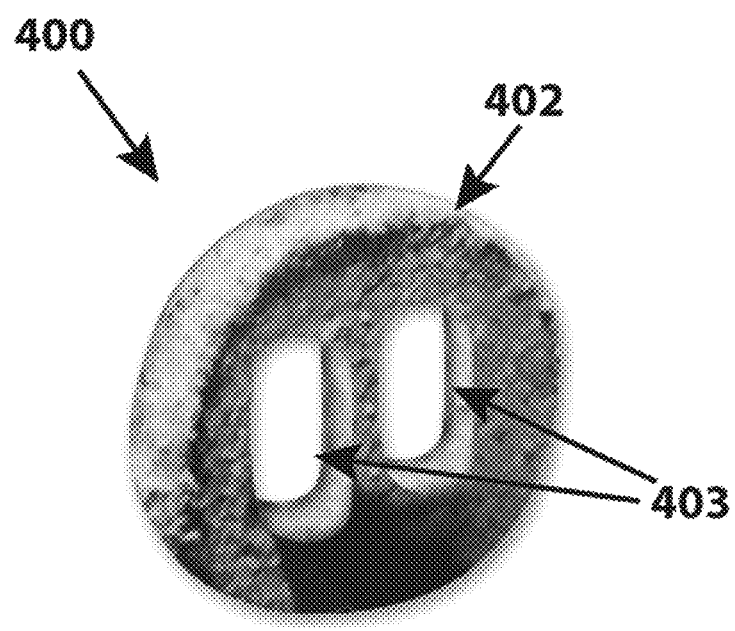
FIG. 4 is an isolated magnified view of the soft sliding tensioner of FIGS. 1 through 3.

FIG. 4 is an isolated view 400 of the sliding tensioner disk 402 highlighting its two slots 403 for threading both ends of the noose. Of course, the size of the slots 403 will vary depending on the thickness of the lead and noose, but should always be slightly larger (e.g., $\approx$0.2 inch or 5 mm) than the thickness of the animal control implement noose material.

Figure 5:
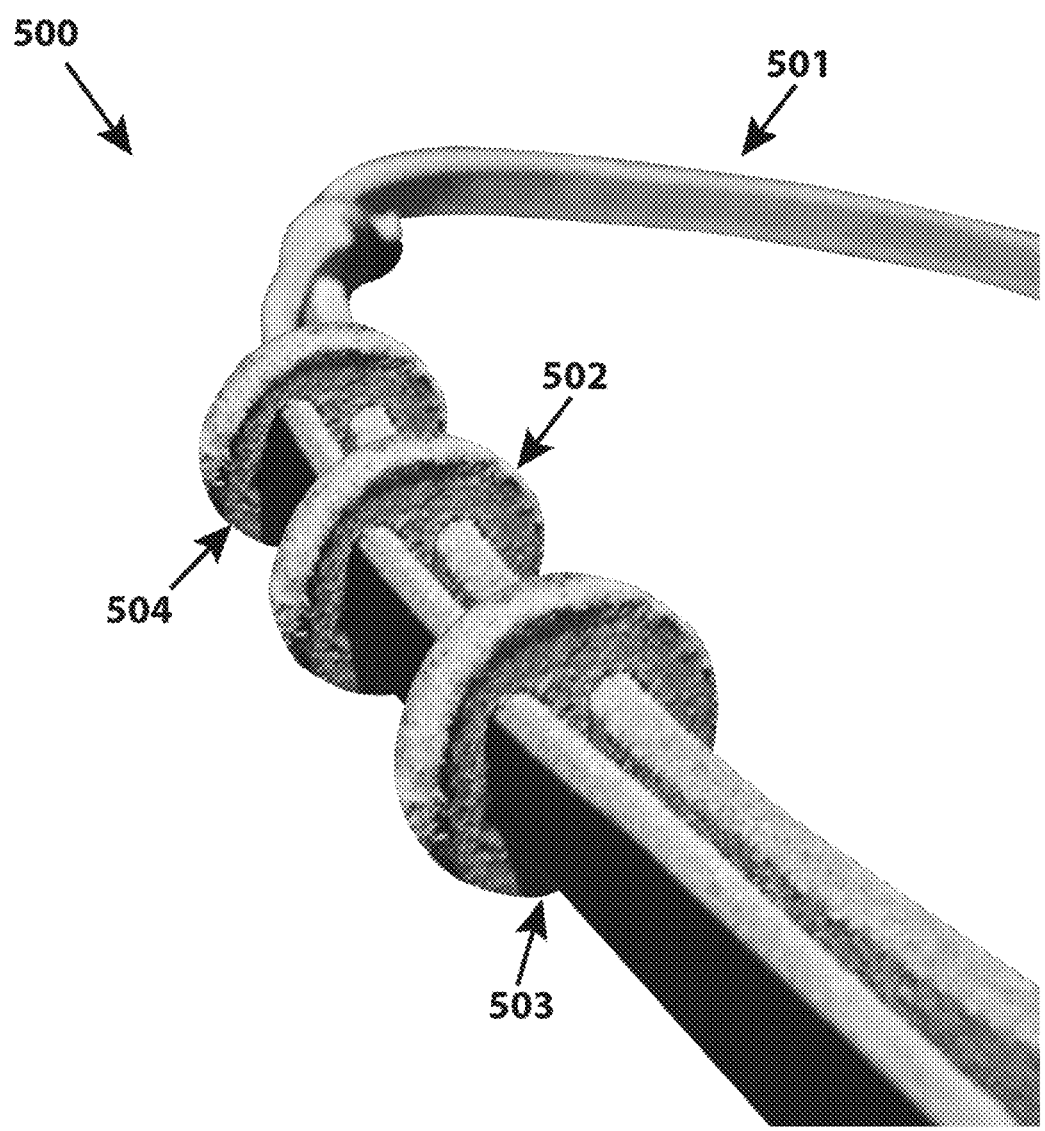
FIG. 5 is a magnified view illustrating multiplicities of the soft sliding tensioner of FIG. 4 thereby increasing friction between the soft sliding tensioner and the animal control implement.

FIG. 5 illustrates an alternative embodiment of the invention with the soft sliding tensioner 203 (FIG. 2) and 302 (FIG. 3) including a total of three sliding disk tensioners 502 through 504 thereby increasing friction between the soft sliding tensioners (502 through 504) and the animal control implement 500. As illustrated in this figure, the elongated portion of the lead is partially depicted as 501. Sliding disk tensioners 502, 503, and 504 can be adjusted by separation (as illustrated in FIG. 5) thereby allowing the noose size to be adjusted and then slide into contact of each other to secure the desired noose size. When the desired noose diameter is achieved sliding disk tensioners 502, 503, and 504 should be positioned flush to each other. The compound effect of multiplicities of soft sliding tensioner (i.e., 502, 503, and 504) greatly increasing the friction between the totality of tensioners and the lead 501 thus further ensuring the sizing of the noose portion (106 FIG. 1, and 202—FIG. 2) even if the animal places tension on the device.

Figure 6:
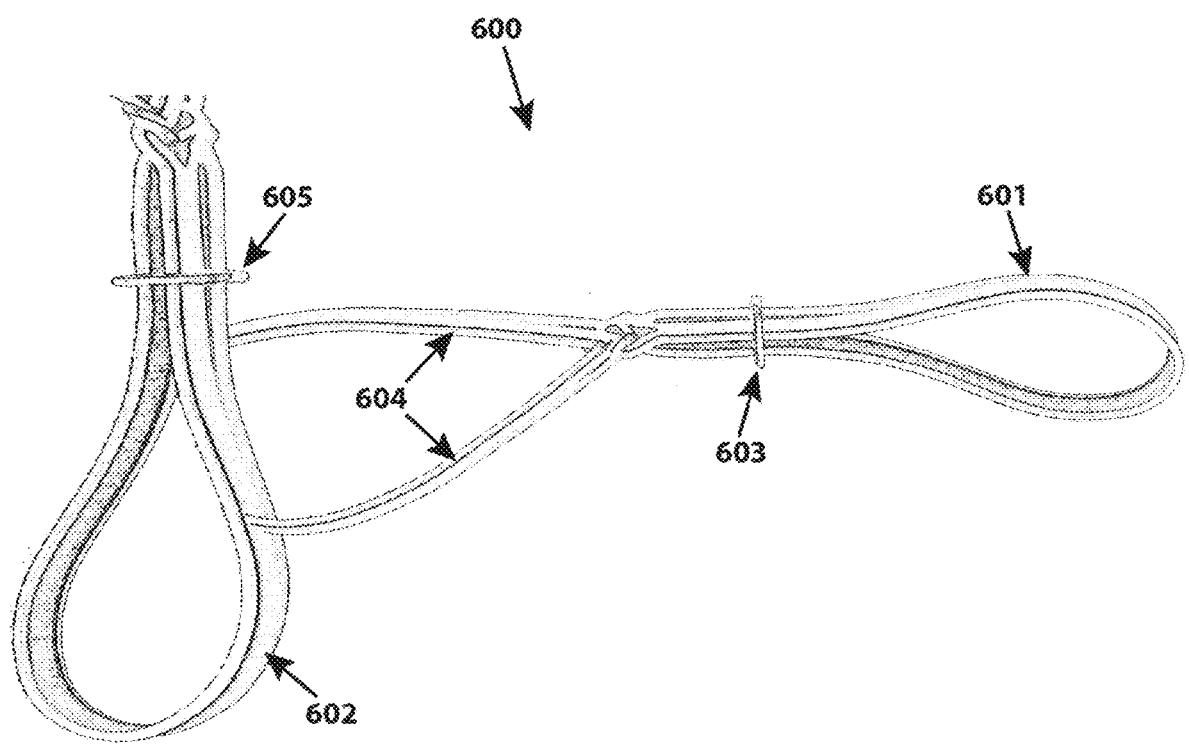
FIG. 6 is an alternative embodiment of a non-metallic animal control implement configured as a harness as embodied by the present invention.

FIG. 6 illustrates a second representative example of a non-metallic animal control implement 600 configured as a harness as embodied by the present invention. In this embodiment, the noose 601 is tethered to a separate body strap 602 via two supporting straps 604. As before, the noose 601 and body strap 602 in this embodiment 600 are adjustable via sliding disk tensioners 603 and 605—identical in construction to disk tensioners 102, 105, 203, 302, and 502 through 504. The body strap 602 sliding disk tensioner 605 also interfaces with the lead (not shown in FIG. 6). The animal control noose 601 is attached to the two supporting straps 604 portions with a braided connection, again maintaining homogeneous soft component fabrication while at the same time providing flexibility and durability. The two supporting straps 604 are attached to the body strap 602 in a similar manner.

It should be appreciated by those skilled in the art that various modifications and variations may be made to the present invention without departing from the scope and spirit of the invention. It is intended that the present invention include such modifications and variations as come within the scope of the appended claims.

What is claimed is:

1. An animal control implement comprising:
   (a) a non-metallic lead portion;
   (b) a single non-metallic human handler interface loop portion which is attached to the lead portion;
   (c) a single non-metallic animal control noose portion, which is attached to the lead portion; and
   (d) a non-metallic mechanism to extend and contract the diameter of the noose portion configured to:
      (i) securely retain a size adjustment when the noose portion is under tension; and
      (ii) enable size adjustments when the noose portion is without tension;
   thereby enabling a human and animal to undergo security screening at the same time while tethered to each other, wherein the non-metallic mechanism to extend and contract the diameter of the noose portion is at least one sliding disk tensioner, and wherein a static coefficient of friction ($\mu_s$) between the sliding disk tensioner and the noose portion is greater than or equal to about 0.55, the noose thereby maintaining any set size under at least five pounds of tension.

2. The animal control implement of claim 1, wherein the non-metallic mechanism to extend and contract the diameter of the noose portion is at least one sliding disk tensioner.

3. The animal control implement of claim 2, wherein three sliding disk tensioners are positioned serially about the non-metallic lead portion.

4. The animal control implement of claim 2, wherein the sliding disk tensioner includes two slots that are about 0.2 inch (5 mm) wider than the thickness of the non-metallic noose portion.

5. The animal control implement of claim 1, wherein the non-metallic mechanism to extend and contract the diameter of the noose portion is configured to maintain any set size up to about five pounds of tension.

6. The animal control implement of claim 1, wherein the non-metallic lead portion, loop portion, noose portion, and mechanism to extend and contract the diameter of the noose portions are comprised primarily of leather.

7. The animal control implement of claim 1 further comprising:
   (e) a non-metallic separate body strap portion connected to the noose portion via supporting straps.

8. The animal control implement of claim 1 wherein the single non-metallic human handler interface loop portion is attached to the lead portion in a uniformly fixed manner.

* * * * *